March 19, 1957 S. B. COHN 2,786,180
SERVO REGULATED MICROWAVE ENERGY SOURCE
Filed Nov. 17, 1951 2 Sheets-Sheet 1

INVENTOR
SEYMOUR B. COHN
BY
ATTORNEY

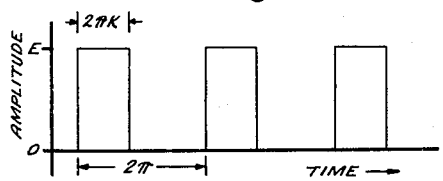
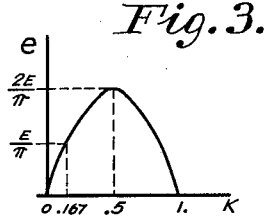
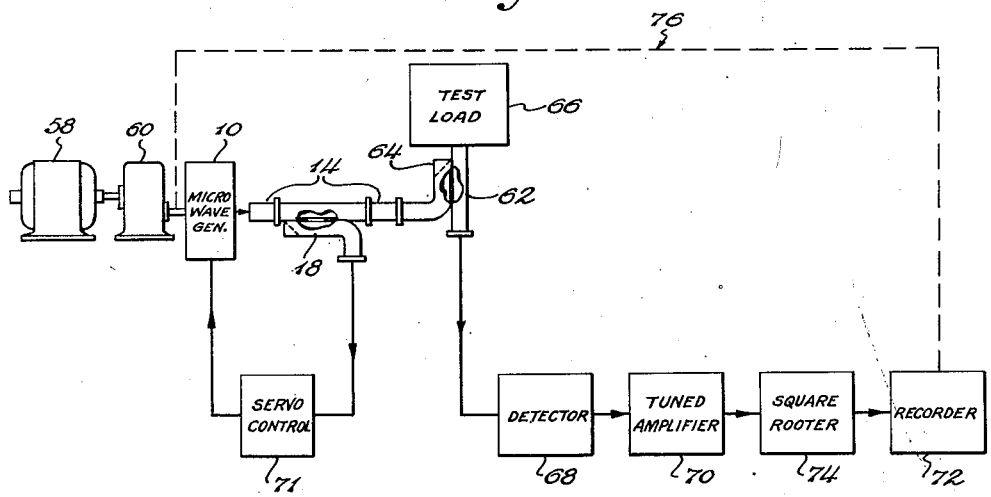
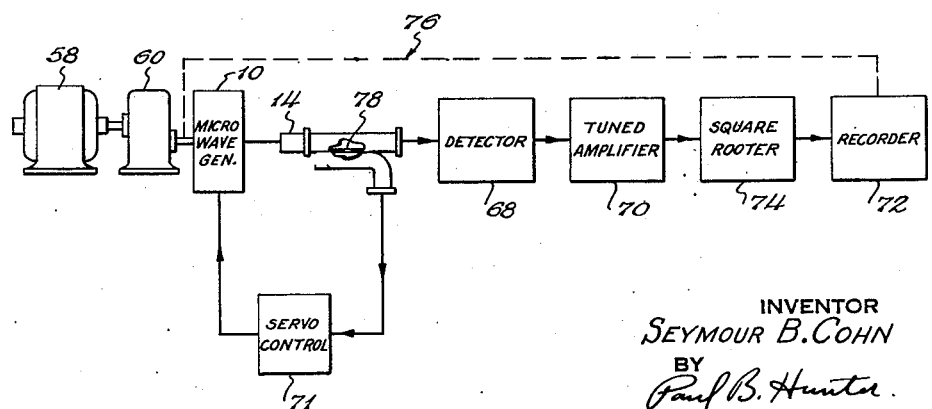

United States Patent Office 2,786,180
Patented Mar. 19, 1957

2,786,180

SERVO REGULATED MICROWAVE ENERGY SOURCE

Seymour B. Cohn, Flushing, N. Y., assignor to Sperry Rand Corporation, a corporation of Delaware Application November 17, 1951, Serial No. 256,886

21 Claims. (Cl. 324—58)

This invention relates to apparatus for automatically determining the reflection coefficient and other related quantities as a function of frequency of a test load, and more particularly, is concerned with a servo regulated microwave energy source for use in combination with a reflectometer and other detecting systems.

Determination of the reflection coefficient or the voltage standing wave ratio in a wave guide transmission line by using a directional coupler type reflectometer is well known. In such a system a directional coupler is inserted in the transmission line between the microwave source and the load, and the reflected energy from the load is detected. The coupler is then reversed or the detector moved to measure the incident wave from the generator. The ratio between the reflected wave and the incident wave is directly equal to the reflection coefficient. The voltage standing wave ratio may be determined from the reflection coefficient by means of a simple well-known mathematical relationship. This procedure is repeated at a number of discrete frequencies to obtain a graphical plot of standing wave ratio as a function of frequency. However, where the load is sharply resonant, for example, unless the selected frequencies are taken sufficiently close together, it is quite possible that the resonant peak will not be detected.

For this reason it is desirable to provide an apparatus that will continuously measure the variations in standing wave ratio or reflection coefficient of a test load as a function of frequency. One method has been heretofore proposed in which a pair of directional couplers are connected in series in the microwave transmission line to measure separately the magnitude of the incident and reflected waves. Computer means may then be employed which is responsive to the instantaneous ratio of the incident and reflected voltage waves. In practice, however, it has proven difficult to achieve the design of an accurate, rapid, and sensitive apparatus which will continuously measure the ratio of two variable signals. A servomotor computer device capable of producing an output signal proportional to the instantaneous ratio of two variable input signals, while possessing the requisite sensitivity and accuracy, is slow in response as well as mechanically complex. A greater speed than can be obtained by such a system in making a reflection coefficient determination over a wide frequency range is desired.

Other proposed methods of obtaining a continuous measurement of reflection coefficient over a wide frequency range have utilized an attenuator on the output of the microwave signal source which is adjusted mechanically by a servo system responsive to the energy of the incident wave in the transmission line, the attenuator being adjusted by the servo to maintain the power in the incident wave at a constant level. Where the output energy of the microwave source has a tendency to fluctuate considerably with changes in signal frequency, this method is too slow in response to permit a rapid sweep through the desired frequency range.

It is the general object of this invention to avoid and overcome the foregoing and other difficulties in and objections to the prior art practices by the provision of a servo regulated microwave energy source which is accurate, more rapid in response, sensitive to small fluctuations, less complex, and highly stable.

Another object of this invention is to provide a rectangular wave modulated microwave source for use in a reflection coefficient recorder.

Another object of this invention is the provision of a microwave source having a rectangular wave modulated output, the fundamental harmonic content of which is held constant regardless of fluctuations of amplitude in the microwave signal.

Another object of this invention is to provide a microwave energy source in which the fundamental harmonic content is held constant by controlling the pulse time duration of the rectangular modulating wave to compensate for fluctuations in amplitude of the microwave signal.

Another object of this invention is the provision of a reflection coefficient measuring apparatus which automatically records in graphical form the reflection coefficient of a test load as a function of frequency.

Another object of this invention is the provision of a reflection coefficient measuring apparatus that is entirely electrical in its operation with the exception of the actual recording mechanism.

Another object of this invention is the provision of apparatus for measuring the frequency response of attenuators and directional couplers in the microwave region.

The foregoing and other objects of this invention which will become apparent as the description proceeds are achieved by the provision of apparatus employing a variable frequency microwave generator for supplying microwave energy to a test load through a hollow wave guide transmission line. The microwave source is rectangular wave modulated at an audio rate. A sampling coupler is inserted in the wave guide transmission line for detecting the incident voltage wave in the line. A tuned amplifier selectively amplifies the fundamental harmonic content of the detected signal, the output of the amplifier being compared with a suitable reference voltage. The difference in amplitude between the two voltages compared is detected as a D. C. error voltage which is used to control a phantastron-type pulse generator, the duty cycle of the phantastron output signal being regulated by the D. C. error voltage. The output of the phantastron is utilized to rectangular wave modulate the microwave source.

For a better understanding of the invention reference should be had to the accompanying drawings, wherein:

Fig. 2 is a graphical representation of the modulating rectangular wave signal;

Fig. 3 is a graphical representation of the variation in the amplitude of the fundamental harmonic with variations in pulse time duration;

Fig. 4 is a block diagram showing the principal components of a reflection coefficient recorder system;

Fig. 5 is a block diagram showing the principles of the invention as utilized in measuring the frequency response of a directional coupler.

Figure 1:
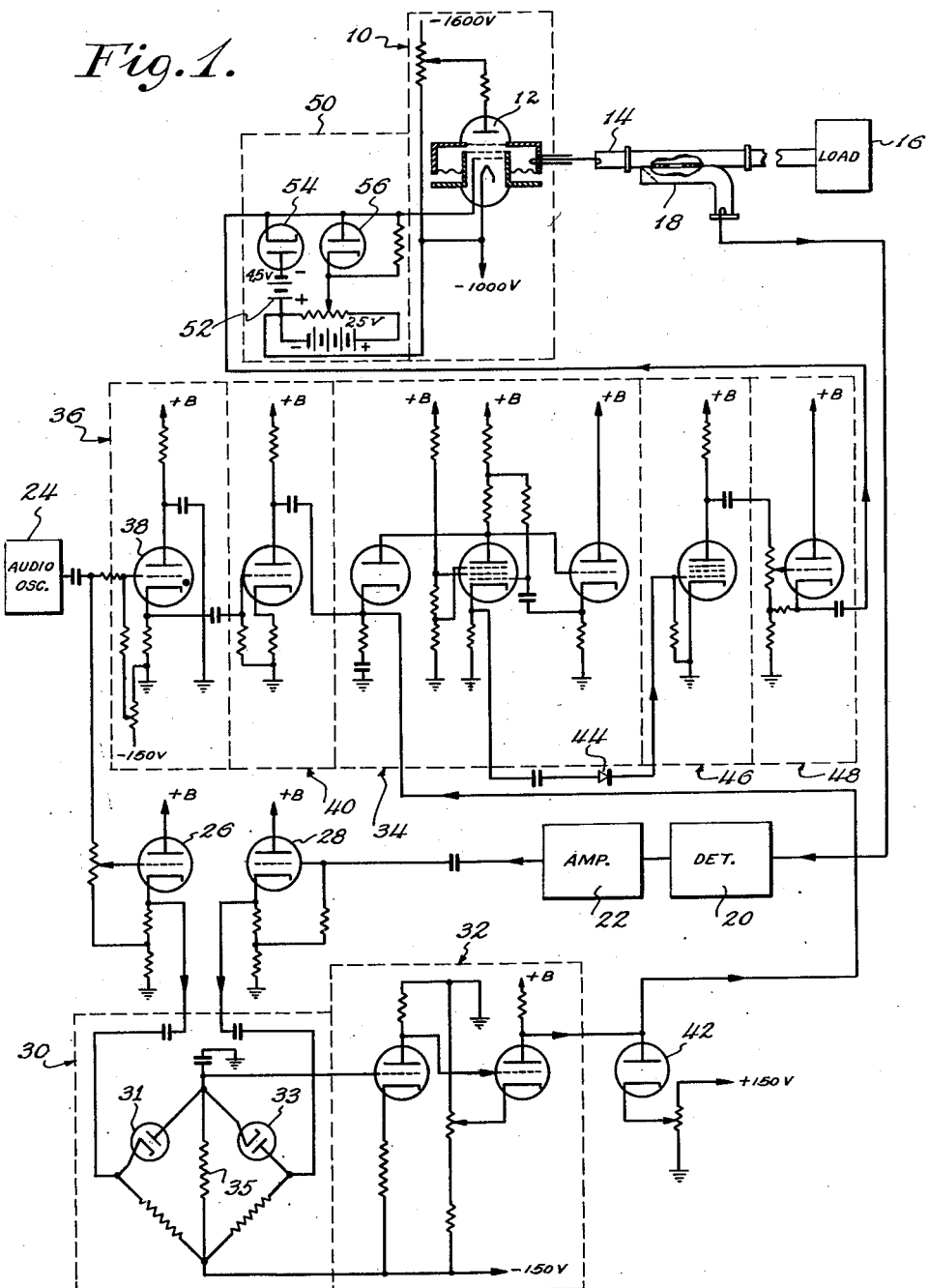
Fig. 1 is a wiring diagram of the servo regulated microwave energy source.

With specific reference to the form of the invention shown in the schematic diagram of Fig. 1, the numeral 10 indicates generally a variable frequency microwave generator including an external cavity klystron 12. The microwave output signal of the generator 10 is assumed variable over a range of 4250 megacycles to 6000, although it is to be understood that the order of frequency variation of the signal generator need not be limited to such a frequency range. The output of the signal generator 10 is coupled to a hollow wave guide transmission line 14 which is adapted to transmit microwave energy to a load 16.

The output signal of the generator 10 is modulated by means hereinafter described to avoid continuous wave operation with the attendant need for D. C. amplifying means in the detecting system. The preferred type of modulation in the microwave region is the interrupted or chopped beam type of modulation wherein the microwave output signal is alternately full on and off. One method for chopping the microwave output is to apply a rectangular wave modulating signal to the grid of the klystron 12, the rectangular wave alternately biasing the klystron in and out of an oscillating condition.

Inserted in series with the transmission line 14 is a sampling directional coupler 18 of a type, for example, having a long cosinusoidally tapered slot, giving the coupler high directivity over a broad frequency band. The coupler 18 samples the energy in the incident wave in the transmission line 14. A detector 20 coupled to the secondary wave guide portion of the directional coupler 18 detects the rectangular wave modulating envelope of the microwave signal, and is preferably a barretter, although a crystal diode or other suitable detector may be employed. The barretter has the advantage that it is substantially square law over a wide range of amplitude of the microwave signal.

The detector 20, in detecting the amplitude modulation of the incident wave from the generator 10, produces a rectangular wave output signal which is fed to a tuned audio amplifier 22 which selectively amplifies the fundamental harmonic of the detected rectangular wave signal. The output of the amplifier 22 is a sine wave, the amplitude of which is a function of the energy in the incident wave from the generator 10.

The amplitude of the microwave signal varies considerably as the microwave generator 10 is varied in frequency, the amplitude of the fundamental harmonic of the detected rectangular wave varying in direct proportion to the power of the microwave signal, if a square-law detector is assumed. However, the amplitude of the fundamental harmonic varies also with the time duration of the rectangular modulating pulse. Referring to Figures 2 and 3, assuming the pulse repetition period of the fundamental harmonic is $2\pi$, the time duration of a single pulse may be expressed as $2\pi K$ where K is a fraction between 0 and 1. Variation of the amplitude $e$ of the fundamental harmonic of the rectangular wave as K is varied between 0 and 1 is given by the graph of Figure 3, the maximum amplitude occurring where the pulse duration time is half the repetition period, or in other words, where $K=0.5$. Thus, if the amplitude of the rectangular wave pulse changes, the amplitude of the fundamental harmonic can be restored by changing the value of K in accordance with the relationship expressed by the curve of Figure 3. The fundamental harmonic content therefore may be maintained constant regardless of fluctuations in the amplitude of the microwave signal by adjusting the time duration of the rectangular wave pulses.

To maintain the frequency of the fundamental harmonic content of the incident wave constant, an audio oscillator or other alternating signal reference source 24 is provided, the output signal of which is preferably of the order of 700 cycles per second. This frequency, however, is not critical but is chosen as a convenient value. The output of the audio oscillator 24 functions as a reference signal, the amplitude being compared with the amplitude of the fundamental harmonic signal from the amplifier 22. These two signals are coupled through cathode followers, indicated generally at 26 and 28 respectively, to an error detector circuit 30 which rectifies each of the signals and applies a difference voltage to the grid of the first stage of a D. C. amplifier 32. The signal taken from each of the cathode follower circuits 26 and 28 is rectified by diodes 31 and 33, respectively, the resulting rectified voltage appearing across the common load resistor 35, which is of a relatively large value. The two diodes are connected inversely so that the polarity of the voltages developed by each across the common resistor 35 are of opposite polarity, the resulting D. C. signal applied to the input of the amplifier 32 being the difference. Thus the output signal of the amplifier 32 is a D. C. voltage which varies in level with changes in the amplitude of the detected fundamental harmonic signal as derived from the output of the amplifier 22.

Since it is desired to vary the time duration of the modulating rectangular wave pulses, a cathode coupled phantastron circuit, indicated generally at 34, is preferably employed as the modulating signal source. The phantastron is characterized by the property that when triggered by a suitable input pulse, the phantastron produces an output pulse having a time duration proportional to an applied D. C. control voltage.

To trigger the phantastron at the desired repetition frequency, the output of the audio oscillator 24 is applied to a pulse generator 36 which includes a thyratron tube 38. Small positive pulses at the frequency of the audio oscillator are taken off the cathode of the thyratron 38 and inverted and amplified by a single stage amplifier 40. The resulting amplified negative pulses are then fed to the phantastron circuit for triggering the modulating pulses.

The phantastron circuit 34 is of a conventional type in which the pulse time duration of the output pulses may be varied linearly with change in a D. C. control voltage over a useful range of about 10 to 700 microseconds. A diode 42 sets the highest value of the phantastron control voltage as derived from the amplifier 32 at a level which limits the maximum time to 700 microseconds or slightly less than half the repetition period.

The output of the phantastron circuit 34 is coupled through a crystal diode 44 to an amplifier 46. The diode 44 and amplifier 46 cooperate to shape and amplify the output pulses of the phantastron 34 to produce a rectangular wave modulating signal which is applied through a cathode follower 48 to the grid of the klystron 12 in the microwave generator 10.

Since the pulse width of the modulating signal varies over a large range, the D. C. level at the grid of the klystron 12 would normally likewise vary over a considerable range. To prevent this, a clipping circuit, indicated generally at 50, is provided. The klystron 12 is normally biased sufficiently to cut off oscillation. Because the grid current, due to electron collection by the grid in the electron beam, is large, the grid must be connected to the cathode through a low resistance path. This is accomplished by means of a diode 54 in series with a 4.5 v. battery 52 which combine to maintain the grid at a negative potential sufficient to cut off oscillation and yet provide a low resistance path back to the cathode. A second diode 56, connected in reverse polarity to diode 54, serves to limit the positive modulation pulse impressed on the klystron grid to a constant voltage sufficient to provide efficient oscillation for the duration of the pulse.

The fundamental harmonic content of the incident wave is therefore held substantially constant regardless of variations in amplitude of the microwave output signal. As the output of the generator 10 varies in amplitude, an error voltage is developed which is greatly amplified and applied as a D. C. control voltage on the phantastron 34. It will be appreciated that an error voltage must always exist between the reference voltage and the fundamental harmonic signal to maintain a D. C. control voltage on the phantastron. However, because the gain of the D. C. amplifier 32 is very large, of the order of 400, the error voltage is very small and must vary only slightly to adjust the phantastron over the 100 to 700 microsecond range.

Referring to Figure 4, the above described servo regulated microwave source may be incorporated in a system for measuring the reflection coefficient and other related quantities of a test load as a function of frequency. To this end, the microwave generator 10 is made mechanically tunable through its frequency band by means such as a motor 58. The motor, through a suitable gear drive 60, progressively changes the output frequency of the generator 10 so that the output signal thereof sweeps once through the entire frequency range. Suitable mechanical means such as a cam in the generator permits a linear change of frequency with rotation of the motor.

The output of the microwave generator 10 is coupled through the hollow wave guide transmission line 14 and the primary wave guide portion of the sampling coupler 18 to a second directional coupler 62, hereinafter referred to as the reflectometer coupler. The primary wave guide portion of the reflectometer coupler 62 is terminated in a non-reflective load 64. The reflectometer coupler 62 is chosen to have the identical characteristics as the sampling coupler 18 and is of a type having a cosinusoidally tapered coupling slot.

The test load 66 is coupled to the secondary wave guide portion of the reflectometer coupler 62. By coupling the test load to the reflectometer coupler in this manner instead of terminating the wave guide with the test load, several advantages are realized.

First, energy received by the load is attenuated in passing through the coupling slot, so that loads of small power handling capacity can be measured without reducing the microwave power available in the overall system. Secondly, very little energy reflected by the test load can get back to the microwave source so that the load is effectively isolated, with the major portion of the energy being absorbed by the non-reflecting termination 64.

A detector 68 is coupled into the secondary wave guide portion of the reflectometer coupler 62 opposite the test load 66, whereby energy reflected by the load is detected. By virtue of the directivity of the reflectometer coupler 62, virtually no energy is received directly by the detector from the incident wave in the wave guide 14. A reflectometer detector 68, having the same frequency sensitivity and response characteristics as the sampling detector 20, is provided, the output of which is amplified by a second tuned audio amplifier 70 which selectively amplifies the fundamental harmonic of the detected rectangular wave signal.

By virtue of the square law property of the detector 68, the reflection coefficient of the test load is equal to the square root of the ratio of the amplitude of the fundamental harmonic content of the reflected wave to the amplitude of the fundamental harmonic content of the incident wave. Thus, it will be appreciated that with the amplitude of the fundamental harmonic content of the incident wave held constant at some known value, the output signal of the second tuned audio amplifier 70 will be a direct measure of the square of the reflection coefficient.

A pen recorder or other suitable recording means 72 is utilized to make a continuous plot of the reflection coefficient of the test load 66 from the output signal of the amplifier 70 as the microwave generator 10 is tuned through the entire frequency range. Since the amplitude of the output signal from the amplifier 70 varies as the square of the reflection coefficient, a non-linear scale is employed in the recorder to give readings of the reflection coefficient. An alternative arrangement which gives a linear scale is to use a square root computer, as indicated at 74. Such square root computers are well known, various types of which are described in volume 19 of the Radiation Series, entitled "Wave Forms," pages 686-691. To provide an accurate frequency scale for the recorder 72, the same motor 58 is used to drive the recorder as tunes the microwave source, as indicated by the dash line 76, so that the recording chart is driven linearly as function of frequency of the microwave source. Means is preferably provided in the pen recorder for marking the margin of the recording chart at intervals, as for example, intervals corresponding to a frequency change of 50 megacycles, to provide an accurate frequency scale.

Referring to Figure 5, the above described servo regulated microwave source may be used to determine the attenuation, for example, of a directional coupler as a function of frequency. The output of the variable frequency microwave generator 10 is coupled through the transmission line 14 to a directional coupler 78, the frequency response characteristics of which are to be determined. The incident wave in the transmission line 14 is coupled through the secondary wave guide portion of the test coupler 78 to control the fundamental harmonic content thereof in the manner described in connection with Figure 1. The primary wave guide portion of the test coupler 78 couples into a detecting and recording system as used in the reflectometer recorder of Figure 4. Any changes in the amplitude of the incident wave detected in the primary wave guide portion of the test coupler 78, as the frequency of the microwave generator 10 is varied, is the result of variations in the attenuation of the energy coupled between the primary and secondary wave guide portions of the test coupler 78 since the output of the microwave generator 10 is regulated to maintain the fundamental harmonic content of the energy in the secondary wave guide portion of the coupler 78 at a constant level. Thus, the recorder 72 gives a continuous plot of the variation in attenuation of the test coupler with change in frequency.

From the above description, it will be recognized that the objects of the invention have been achieved by the provision of a measuring device capable of determining the reflection coefficient and other related quantities of a test load, including the attenuation characteristics of a directional coupler, as a function of frequency. A plot of the measured quantity over a 40% frequency band is obtained automatically in less than a minute. The fundamental of the modulating signal is successfully utilized in the recording systems described. This permits the use of narrow band amplifiers in amplifying the detected signal from the sampling and reflectometer couplers where otherwise very broad amplifiers capable of amplifying the rectangular wave modulating signal would be required, narrow band amplifiers having the advantage that they can be more easily built with higher gain and much lower noise level.

However, by utilizing the fundamental harmonic of the modulating signal, it is not necessary to maintain the microwave energy constant but only to regulate the system to keep the fundamental harmonic constant. This is accomplished in a unique and relatively simple manner by adjusting the rectangular wave pulse time duration to compensate for the changes in amplitude of the microwave signal.

While the reflection coefficient recorder and servo regulated power source have been described as utilizing and regulating the fundamental (i. e. first) harmonic of the modulating rectangular wave, other harmonics can be used although the degree of control is limited. The prime requisite is that both the servo control and measurement circuits be responsive to the same harmonic frequency. Hence, the word "harmonic" as used in the claims refers to all sine wave frequency components present in the modulating signal including the fundamental.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In combination, a microwave energy source, an audio frequency reference voltage source, trigger pulse generating means synchronized in frequency by the reference voltage source, a phantastron pulse generator triggered by the output of the trigger pulse generating means, the time duration of the phantastron output pulses being proportional to an applied direct current control voltage, amplifying means for shaping and amplifying the output signal of the phantastron pulse generator to provide a rectangular wave signal, the output of said amplifying means being coupled to the microwave energy source for modulating the output signal of the microwave source, a detector coupled to the output of the microwave source for detecting the rectangular wave modulating signal, a tuned amplifier coupled to the output of the detector for selectively amplifying the fundamental harmonic of the detected rectangular wave signal, error detecting means responsive to the difference in potential between the reference voltage and the output of the tuned amplifier, the error detecting means producing a direct current error voltage proportional to the difference in amplitude between the two signals compared in the error detector, and direct current amplifying means for amplifying the error voltage, the output of the direct current amplifying means being applied to the phantastron pulse generator for varying the time duration of the phantastron output pulses to maintain the error voltage at a minimum.

2. In combination, a microwave energy source, a reference voltage source, a phantastron pulse generator synchronized in frequency by said reference voltage source, the time duration of the phantastron output pulses being proportional to an applied direct current control voltage, amplifying means for shaping and amplifying the output signal of the phantastron pulse generator to provide a rectangular wave signal, the output of said amplifying means being coupled to the microwave energy source for rectangular wave modulating the output signal of the microwave source, a detector coupled to the output of the microwave source for detecting the signal modulation, a tuned amplifier coupled to the output of the detector for selectively amplifying the fundamental harmonic of the detected signal, error detecting means responsive to the difference in potential between the reference voltage and the output of the tuned amplifier, the error detecting means producing a direct current error voltage proportional to the difference in amplitude between the two signals compared in the error detector, and direct current amplifying means for amplifying the error voltage, the output of the direct current amplifying means being applied to the phantastron pulse generator for varying the time duration of the phantastron output pulses to maintain the error voltage at a minimum.

3. In combination, a microwave energy source, a reference voltage source, phantastron pulse generating means synchronized in frequency by said reference voltage source, the time duration of the phantastron output pulses being proportional to an applied direct current control voltage, the output of said pulse generating means being coupled to the microwave source for modulating the microwave signal, a detector coupled to the output of the microwave source for detecting the signal modulation, a tuned amplifier coupled to the output of the detector for selectively amplifying the foundamental harmonic of the detected signal, error detecting means responsive to the difference in potential between the reference voltage and the output of the tuned amplifier, the error detecting means producing a direct current error voltage proportional to the difference in amplitude between the two signals compared in the error detector, and direct current amplifying means for amplifying the error voltage, the output of the direct current amplifying means being applied to the phantastron pulse generating means for varying the time duration of the phantastron output pulses to maintain the error voltage at a minimum.

4. Apparatus for regulating the fundamental harmonic content of a rectangular wave modulated microwave signal, said apparatus comprising a microwave energy source, a reference voltage source, phantastron pulse generating means synchronized in frequency by said reference voltage source, the time duration of the phantastron output pulses being proportional to an applied direct current control voltage, the output of said pulse generating means being coupled to the microwave source, a detector coupled to the output of the microwave source for detecting the rectangular wave signal modulation, means coupled to the output of said detector for isolating the fundamental harmonic of the detected rectangular wave signal, error detecting means responsive to the difference in potential between the reference voltage and the output of said isolating means, the error detecting means producing a direct current error voltage proportional to the difference in amplitude between the two signals compared in the error detector, and direct current amplifying means for amplifying the error voltage, the output of the direct current amplifying means being applied to the phantastron pulse generating means for varying the time duration of the phantastron output pulses to maintain the error voltage at a minimum.

5. Apparatus for regulating the fundamental harmonic content of a rectangular wave modulated microwave signal, said apparatus comprising a microwave energy source, a reference voltage source, phantastron pulse generating means synchronized in frequency by said reference voltage source, the time duration of the phantastron output pulses being proportional to an applied direct current control voltage, the output of said pulse generating means being coupled to the microwave source, a detector coupled to the output of the microwave source for detecting the rectangular wave modulating signal, means coupled to the output of said detector for isolating the fundamental harmonic of the detected rectangular wave signal, and error detecting means responsive to the difference in potential between the reference voltage and the output of said isolating means, the error detecting means producing a direct current error voltage proportional to the difference in amplitude between the two signals compared in the error detector, the output of the error detector being applied to the phantastron pulse generating means for varying the time duration of the phantastron output pulses to maintain the error voltage at a minimum.

6. In combination, a microwave energy source, a reference voltage source, pulse generating means synchronized in frequency by said reference voltage source, the time duration of the output pulses being proportional to an applied control voltage, the output of said pulse generating means being coupled to the microwave source, a detector coupled to the output of the microwave source, means coupled to the output of said detector for isolating the fundamental harmonic of the detected signal, and error detecting means responsive to the difference in potential between the reference voltage and the output of said isolating means, the error detecting means producing a voltage proportional to the difference in amplitude between the two signals compared in the error detector, the output of the error detector being applied to the pulse generating means for varying the time duration of the output pulses to maintain the error voltage at a minimum.

7. Apparatus for controlling the power output of an energy source including means for interrupting the flow of energy from the source at a fixed predetermined repetition frequency whereby the energy is rectangular wave modulated, means for varying the ratio of on to off time in one repetition cycle of said interrupting means, amplitude detector means responsive to the modulated output of said energy source, means coupled to the output of said detector means for isolating the fundamental harmonic component of the detected rectangular wave signal, error detecting means responsive to variations in amplitude of the fundamental harmonic component of the rectangular wave signal, said error detecting means being coupled to said ratio varying means for adjusting said ratio of on to off time whereby the average energy output of the source is controlled so as to maintain the amplitude of the fundamental harmonic of the rectangular wave signal constant.

8. Apparatus for controlling the power output of an energy source including means for interrupting the flow of energy from the source at a fixed predetermined repetition frequency, means operatively associated with said energy interrupting means for varying the time ratio of energy cutoff to energy flow in one repetition cycle of said interrupting means; means responsive to the periodically interrupted output of said energy source for producing an alternating output signal at the repetition frequency of said interrupting means, the amplitude of said alternating signal being a function of both the amplitude of the energy source output signal and said time ratio, and means responsive to the amplitude of said alternating signal, said means being operatively associated with said interrupting means for adjusting said time ratio so as to maintain the amplitude of the alternating signal substantially constant.

9. Apparatus for controlling the output signal of an energy source including means associated with the energy source for pulse modulating the output signal thereof at a fixed predetermined repetition frequency, means for detecting the modulated output signal of said energy source, said detecting means providing a demodulated version of said output signal, means for selectively amplifying a single harmonic of the output of said detecting means, and means responsive to the output of the selective amplifying means and coupled to the modulating means for varying the modulation wave shape to compensate for fluctuations in the energy source.

10. In combination, a source of microwave energy, means for on-off modulating the output of said source at a predetermined modulation frequency, means responsive to the on-off modulated microwave signal for producing a demodulated version thereof, means including a frequency-selective circuit and detecting means responsive to said last named means for producing a unidirectional output voltage varying according to variations of a predetermined harmonic component of said demodulated version, and means responsive to said unidirectional output voltage for varying the ratio of on and off time per cycle of said modulation.

11. In combination, a source of microwave energy, means for on-off modulating the output of said source of energy at a fixed predetermined frequency, means for amplitude detecting and selecting the fundamental harmonic output component of the modulated energy, and means responsive to the amplitude of the output signal from said last-named means for varying the ratio of modulation on time to off time according to amplitude variations of said fundamental output component.

12. Apparatus for measuring and recording the reflection coefficient of a test load as a function of frequency comprising a variable frequency microwave oscillator, a sampling directional coupler and reflectometer directional coupler having primary and secondary wave guide portions, the primary wave guide portions being connected in series to the oscillator, the test load being connected in the secondary wave guide portion of said reflectometer coupler, rectangular wave generating means for pulse modulating the microwave oscillator output, a reflectometer detector coupled to the secondary wave guide portion of the reflectometer coupler, said detector being responsive to the reflected wave from the test load, tuned amplifying means for selectively amplifying the fundamental harmonic of the detected signal, recording means coupled to the output of said amplifier for continuously indicating the amplitude of the output signal of the amplifier in terms of reflection coefficient values, a sampling detector coupled to the secondary wave guide portion of the sampling coupler, said sampling detector being responsive to the incident wave from the microwave generator, second tuned amplifying means for selectively amplifying the fundamental harmonic of the detected signal, and means responsive to slight variations in the amplitude of the output of said second amplifying means for varying the pulse time duration of the output of the rectangular wave generating means.

13. Apparatus for measuring the reflection coefficient of a test load as a function of frequency comprising a microwave oscillator, a sampling directional coupler and reflectometer directional coupler having primary and secondary wave guide portions, said couplers being connected in series for coupling the test load to the output of the microwave oscillator, means for pulse modulating the microwave oscillator output, a reflectometer detector coupled to the reflectometer coupler, said detector being responsive to the reflected wave from the test load, tuned amplifying means for selectively amplifying the fundamental harmonic of the detected signal, means responsive to the amplitude of the fundamental harmonic of the reflected wave for indicating directly the reflection coefficient of the test load, a sampling detector coupled to the sampling coupler, said sampling detector being responsive to the incident wave from the microwave generator, second tuned amplifying means for selectively amplifying the fundamental harmonic of the detected signal, and means responsive to slight variations in the amplitude of the output of said second amplifying means for varying the pulse time duration of the output of the pulse modulating means.

14. Apparatus for measuring the reflection coefficient of a test load as a function of frequency comprising a microwave oscillator, means for coupling the test load to the output of the microwave oscillator, means for pulse modulating the microwave oscillator output, detector means selectively responsive to the reflected wave from the test load for detecting the modulation component of the reflected microwave signal, tuned amplifying means for selectively amplifying the fundamental harmonic of the detected signal, means responsive to the amplitude of the fundamental harmonic of the reflected wave for indicating directly the reflection coefficient of the test load, second detector means responsive to the incident wave from the oscillator for detecting the modulation component of the incident microwave signal, second tuned amplifying means for selectively amplifying the fundamental harmonic of the detected signal, and means responsive to slight variations in the amplitude of the output of said second amplifying means for varying the pulse time duration of the output of the pulse modulating means.

15. Apparatus for measuring the reflection coefficient of a test load as a function of frequency comprising a microwave source, means for coupling the test load to the output of the microwave source, means for pulse modulating the microwave signal, detector means selectively responsive to the reflected wave from the test load for detecting the modulation component of the reflected microwave signal, means for selectively amplifying the fundamental harmonic of the detected signal, means responsive to the amplitude of the fundamental harmonic of the reflected wave for indicating directly the reflection coefficient of the test load, second detector means responsive to the incident wave from the oscillator for detecting the modulation component of the incident microwave signal, second means for selectively amplifying the fundamental harmonic of the detected signal, and means responsive to slight variations in the amplitude of the output of said second amplifying means for varying the pulse time duration of the output of the pulse modulating means.

16. Apparatus for measuring the reflection coefficient of a test load comprising a variable frequency microwave energy source associated with the test load, means for pulse modulating the microwave source, said pulse modulating means generating pulses having a constant repetition frequency but variable pulse time duration, the pulse time duration being a function of an applied control voltage, a sampling detector, a reflection detector, directional coupling means for coupling the sampling and reflection detectors respectively to the incident and reflected waves between the microwave source and the test load, means responsive to the detected signals for isolating the fundamental harmonic content of said detected signals, indicating means responsive to the fundamental harmonic content of the reflected wave for directly indicating the reflection coefficient, and error detecting means for comparing the amplitude of the fundamental harmonic of the incident wave with a fixed reference voltage for producing an error voltage proportional to the difference therebetween, said error voltage being applied to the pulse generating means as said control voltage for varying the pulse time duration as a function of the fundamental harmonic content of the incident wave.

17. Apparatus for measuring the reflection coefficient of a test load comprising an alternating signal source associated with the test load, means for pulse modulating the alternating signal, said pulse modulating means generating pulses having a constant repetition frequency but variable pulse time duration, the pulse time duration being a function of an applied control voltage, a sampling detector, a reflection detector, directional coupling means for coupling the sampling and reflection detectors respectively to the incident and reflected waves between the source and the test load, means responsive to the detected signals for isolating the fundamental harmonic content of said detected signals, indicating means responsive to the fundamental harmonic content of the reflected wave for directly indicating the reflection coefficient, and error detecting means for comparing the amplitude of the fundamental harmonic of the incident wave with a fixed reference voltage for producing an error voltage proportional to the difference therebetween, said error voltage being applied to the pulse generating means as said control voltage for varying the pulse time duration as a function of the fundamental harmonic content of the incident wave.

18. Apparatus for measuring the reflection coefficient of a test load comprising an alternating signal source associated with the test load, means for pulse modulating the alternating signal, detecting means responsive to the wave reflected back to the source by the test load, means for isolating the fundamental harmonic of the detected signal, indicating means responsive to the fundamental harmonic content of the reflected wave for directly indicating the reflection coefficient, and means responsive to variations in amplitude of the fundamental harmonic of the modulated alternating signal for regulating said pulse modulating means, whereby the amplitude of the fundamental harmonic of the modulated incident wave from the alternating signal source is maintained at a constant level regardless of fluctuations in the energy level of the alternating signal.

19. Apparatus for determining the impedance characteristics of a load as a function of frequency in the microwave region, said apparatus comprising a variable frequency energy source, the output signal of the source being coupled to said load, means associated with said source for modulating the output signal thereof, means for selectively detecting energy reflected from the load back to the source, said means providing a demodulated signal, first amplifying means responsive to the demodulated signal for selectively amplifying a single harmonic of the demodulated output of the reflected energy detecting means, means for detecting an attenuated demodulated version of the modulated output of said energy source, second amplifying means responsive to the demodulated output signal of said last named detecting means for selectively amplifying a single harmonic of the demodulated output of said last named detecting means, said second amplifying means selectively amplifying the same harmonic frequency as said first amplifying means, means responsive to the output of said second amplifying means for varying the modulation wave shape to compensate for fluctuations in the energy source, recording means coupled to the output of said first amplifying means for making a record of variations in output thereof, and means for simultaneously driving the recording means and varying the frequency of the variable frequency source to maintain a correlation between the record and instantaneous frequency of the source.

20. Apparatus for measuring the attenuation characteristic as a function of frequency of a directional coupler having a primary and secondary wave guide section, said apparatus comprising a variable frequency energy source, the output being coupled to the primary section of the directional coupler, means associated with the source for pulse modulating the output thereof, a detector coupled to the secondary wave guide section of the directional coupler for producing an attenuated demodulated version of the output of said energy source, means for selectively amplifying the fundamental harmonic portion of the demodulated signal from said detector, means responsive to the output of said amplifying means for varying the pulse time duration of the modulating pulses, a second detector coupled to the primary wave guide section of the coupler for producing a demodulated version of the output of said energy source, means for selectively amplifying the fundamental harmonic portion of the demodulated signal from said second detector, recording means responsive to the output of said last named amplifying means for making a record of variations in output thereof, and means for simultaneously driving the recording means and varying the frequency of said source to maintain a correlation between the record and instantaneous frequency of the source.

21. Apparatus for measuring the attenuation characteristic as a function of frequency of a directional coupler having a primary and secondary wave guide section, said apparatus comprising a variable frequency energy source, the output being coupled to the primary section of the directional coupler, means associated with the source for modulating the output thereof, a detector coupled to the secondary wave guide section of the directional coupler for producing an attenuated demodulated version of the output of said energy source, means for selectively amplifying a harmonic portion of the demodulated signal from said detector, means responsive to the output of said amplifying means for varying the wave shape of the modulating signal, a second detector coupled to the primary wave guide section of the coupler for producing a demodulated version of the output of said energy source, means for selectively amplifying a harmonic portion of the demodulated signal from said second detector, recording means responsive to the output of said last named amplifying means for making a record of variations in output thereof, and means for simultaneously driving the recording means and varying the frequency of said source to maintain a correlation between the record and instantaneous frequency of the source.

(References on following page)

References Cited in the file of this patent

UNITED STATES PATENTS

| | | |
|---|---|---|
| 2,442,606 | Korman | June 1, 1948 |
| 2,510,054 | Alexander et al. | June 6, 1950 |
| 2,545,997 | Hagopian | Mar. 20, 1951 |
| 2,562,894 | Mengel | Aug. 7, 1951 |
| 2,566,020 | Fenn | Aug. 28, 1951 |
| 2,580,678 | Hansen et al. | Jan. 1, 1952 |
| 2,597,303 | Dicke | May 20, 1952 |
| 2,654,863 | Riblet | Oct. 6, 1953 |